Aug. 31, 1965     S. G. WILLIAMS     3,203,185
HYDROSTATIC TRANSMISSION
Filed Oct. 24, 1963     2 Sheets-Sheet 1

INVENTOR
SAMUEL G. WILLIAMS
BY Dodge and Sons
ATTORNEYS 3,203,185
HYDROSTATIC TRANSMISSION
Samuel G. Williams, Cape Vincent, N.Y., assignor to The New York Air Brake Company, a corporation of New Jersey
Filed Oct. 24, 1963, Ser. No. 318,639
6 Claims. (Cl. 60—53)

This invention relates to hydrostatic transmissions.

In some installations it is required that a device which imposes varying or reversible loads be driven smoothly at a substantially constant selected speed. One example of such an installation is that employed in the process of welding a circumferential seam on a large tank or cylinder wherein the tank is rotated past a stationary welding torch. Here the tanks frequently are formed with eccentric masses, such as hatches or bins, which are not balanced for rotation about the axis of the tank. As a result, each eccentric mass exerts a load that retards movement of the tank during one-half of a revolution and aids movement of the tank during the balance of each revolution. As the center of gravity of the eccentric mass passes through the vertical plane containing the axis of rotation the direction of action of its load reverses and this produces a rather sudden acceleration or deceleration of the tank. In those cases where the eccentric mass is large enough to effect a complete reversal in the direction of torque transmission, the backlash in the driving means is taken up in one direction or the other each time the mass moves over center and the accompanying shocks or jerks are intensified. Since sudden changes in the speed of the tank can cause either a break in the welding arc, and consequently in the weld bead, or an excessive build-up of weld material, it is apparent that the results are far from optimum.

The object of this invention is to provide a hydrostatic transmission for driving devices of the kind mentioned above which affords smooth driving action in spite of variations in the load exerted by the device. In accordance with this invention, the hydrostatic transmission comprises a pump, preferably of the variable delivery type, a motor which is driven by the pump and which itself drives the device, conduits interconnecting the pump and motor in a closed transmission circuit, and auxiliary loading means for imposing on the motor a substantially constant load which is large in relation to the magnitude of the change in the load exerted by the driven device. Since a large portion of the total power demand imposed on the hydrostatic transmission is attributable to the auxiliary loading means, and this portion is constant, it will be apparent that the percentage change in power demand attributable to the change in the load exerted by the driven device is reduced. As a result, the magnitude of the acceleration or deceleration attributable to this change in load is decreased. In those cases where the load exerted by the driven device can change direction, the auxiliary loading means is so sized that the direction of torque transmission does not reverse. Consequently, in this case, the jerk-intensifying effects of backlash also are avoided.

In one embodiment of the invention, the auxiliary loading means takes the form of a relief valve interposed in the closed transmission circuit in the return conduit leading from the motor to the pump and set to maintain on the motor discharge port a backpressure selected in accordance with the magnitude of the anticipated load variation. In reversible transmissions, i.e., those in which the direction of flow through the closed circuit can be reversed to drive the load in opposite directions, each of the main transmission conduits is provided with a relief valve and a bypass path that allows free flow around the relief valve from the pump to the motor.

While this type of auxiliary loading means represents a low cost way of affording smooth driving action, it is inefficient because of the continued waste of energy at the relief valve.

In the preferred form of the invention, the auxiliary loading means is a pressure compensated variable delivery pump which is driven by the motor and connected in the closed transmission circuit between the discharge port of the motor and the inlet port of the pump. Means are provided for maintaining the inlet pressure of the auxiliary pump substantially constant, and, therefore, since the pressure compensator inherently maintains its discharge pressure constant, the auxiliary pump imposes a substantially constant load on the motor. As in the first form of the invention, this load is selected with regard to the magnitude of the variation in load imposed by the driven device so that the driving speed is kept within prescribed limits. Since the fluid discharged by the auxiliary pump in this embodiment is used as the supply for the main pump, the power demand on the prime mover is reduced and, in effect, much of the energy expended in the auxiliary loading means is recovered. Thus, this type of loading means is more efficient than the relief valve type.

When the preferred embodiment is incorporated in a reversible transmission, both the motor and the auxiliary pump take the form of a pressure compensated pump-motor unit, and flow direction responsive means are provided for overriding the compensator associated with the unit being supplied by the main pump and causing this unit to operate as a fixed displacement unit. In this way, either pump-motor unit may serve as the main drive motor while the other unit serves as the auxiliary loading means.

Several embodiments of the invention are described herein with reference to the accompanying drawings in which FIG. 1 is a schematic diagram of a unidirectional transmission employing the relief valve type of auxiliary loading means.

Figure 1:
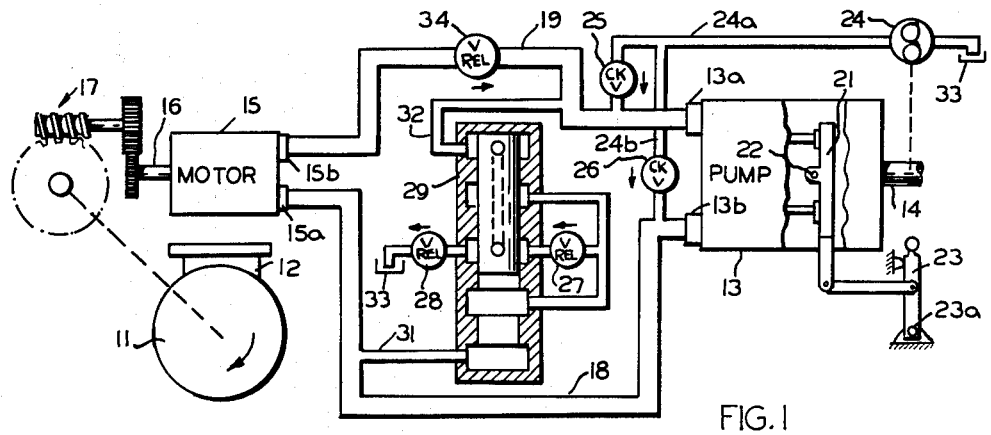

As shown in FIG. 1, the hydrostatic transmission is employed to rotate a tank 11, having an eccentric hatch 12, past a stationary welding torch (not shown) for the purpose of welding a circumferential seam on the tank. The transmission includes a variable displacement pump 13 having inlet and discharge ports 13a and 13b, respectively, and a drive shaft 14 which is connected with a constant speed prime mover, such as an electric motor (not shown), and a fixed displacement motor 15 having inlet and discharge ports 15a and 15b, respectively, and a drive shaft 16 which is connected with the tank 11 through a speed reduction gear train 17. The pump and motor are connected in a closed transmission circuit by a pair of main conduits 18 and 19. Both pump 13 and motor 15 are of the rotary cylinder barrel, longitudinally reciprocating piston type, and pump 13 includes a cam plate 21 which is angularly adjustable about the axis of trunnion 22, between the illustrated zero displacement position and a maximum displacement position, by a manual actuator 23. The prime mover also drives a charge pump 24, which usually is incorporated in the housing of pump 13, and which is connected with main conduits 19 and 18 through conduits 24a and 24b, respectively, containing check valves 25 and 26. The charge pump 24 maintains the circuit liquid filled. The transmission also includes a relief circuit of the type described in U.S. Patent 2,961,829, issued November 29, 1960, and comprising high and low pressure relief valves 27 and 28, respectively, and a shuttle valve 29. The shuttle valve 29 is connected with the main conduits 18 and 19 by conduits 31 and 32, respectively, and serves to connect whichever of these main conduits is the high pressure conduit with high pressure relief valve 27 and to connect the other main conduit with low pressure relief valve 28. Low pressure relief valve 28 discharges to a reservoir 33 with which charge pump 24 is connected.

The auxiliary loading means in the first embodiment takes the form of a relief valve 34 which is interposed in main conduit 19 between port 15b and the junction with conduit 32 and arranged to permit flow from this port 15b to pump inlet port 13a upon the occurrence of a predetermined pressure differential selected in accordance with the load variations attributable to eccentric hatch 12. Since the relief valve 34 is in the closed transmission circuit, the transmission should include a cooler for the hydraulic fluid in those cases where continuous operation is required.

During a welding cycle, the operator moves actuator 23 in the clockwise direction about its pivot 23a to thereby move cam plate 21 in the counterclockwise direction about the axis of trunnion 22 and cause pump 13 to discharge fluid to main conduit 18. This fluid flows to motor 15, where it causes the motor to rotate drum 11 in the direction of the arrow, and is returned to the pump through main conduit 19 and relief valve 34. The speed at which motor 15 drives tank 11 depends upon the angular position of cam plate 21 and this is selected by the operator.

As tank 11 rotates through the illustrated position, in which it is assumed the center of gravity of hatch 12 lies on the vertical plane passing through the axis of rotation, the load exerted by the hatch 12 changes direction and commences to aid the hydrostatic transmission. This change in the direction of action of the load imposed by hatch 12 causes tank 11 to accelerate and, in the absence of relief valve 34, this jerk in the motion of drum 11 could interrupt the welding arc. However, with the relief valve 34 in the circuit, the transmission is maintained under a considerable load at all times so that the rate of change of driving speed is kept within tolerable limits. When the center of gravity of hatch 12 passes through a point 180° from the one illustrated in FIG. 1, the load exerted by the hatch commences to retard movement of tank 11 and the tank decelerates. However, since relief valve 34 has been maintaining pump 13 under considerable load, the rate of deceleration is kept within acceptable limits. As a result, drum 11 does not slow down sufficiently to allow an excessive build-up of weld material.

The setting of relief valve 34 depends upon the magnitude of the change in the torque load exerted by hatch 12 and upon the speed change which can be tolerated by the welding process. Since the rigidity of the transmission increases with an increase in pressure, it will be apparent that as the cracking pressure of valve 34 is increased, the driving action becomes smoother. In cases where a reversal in the direction of torque transmission is anticipated, valve 34 is set to insure that motor 15 is always loaded in one direction. The prevention of overrun is particularly important in circuits, such as the ones illustrated herein which employ a shuttle valve 29, because this valve contributes significantly to the total backlash of the driving system. This is so because when shuttle valve 29 shifts in response to the reversal of the pressure relationship between main conduits 18 and 19 that accompanies an overrun condition, it increases the effective volume of main conduit 19. This increased demand for fluid constitutes "give" or backlash in the transmission which is avoided by the auxiliary loading scheme of the present invention.

Figure 2:
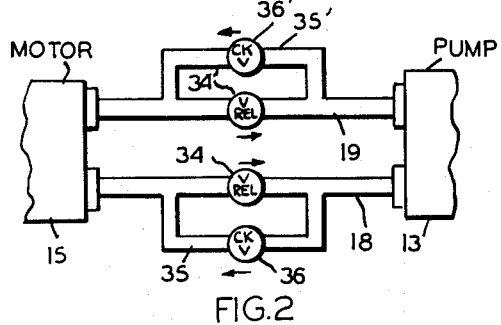
FIG. 2 is a schematic diagram of a portion of the FIG. 1 circuit showing the modifications required for a reversible transmission.

In cases where tank 11 must be driven smoothly in opposite directions, the embodiment of FIG. 2 is employed. In this embodiment, the main conduits 18 and 19 are provided with relief valves 34 and 34', which are interposed between the motor ports and the junctions with the shuttle valve conduits (not shown), and bypass conduits 35 and 35' containing check valves 36 and 36'. Motor 15 is reversible and the direction of flow through pump 13 can be reversed by either changing its direction of rotation or by moving its cam plate over center. When pump 13 discharges to main conduit 18, fluid is delivered to motor 15 through the substantially unrestricted path defined by bypass conduit 35 and is returned to the pump through main conduit 19 and relief valve 34'. Therefore, in this case valve 34' serves as the auxiliary loading means. On the other hand, when pump 13 discharges to main conduit 19, bypass conduit 35' forms part of the delivery path to motor 15 and relief valve 34 serves as the auxiliary loading means. Thus, in this embodiment, smooth driving action is afforded in both the forward and the reverse directions.

Figure 3:
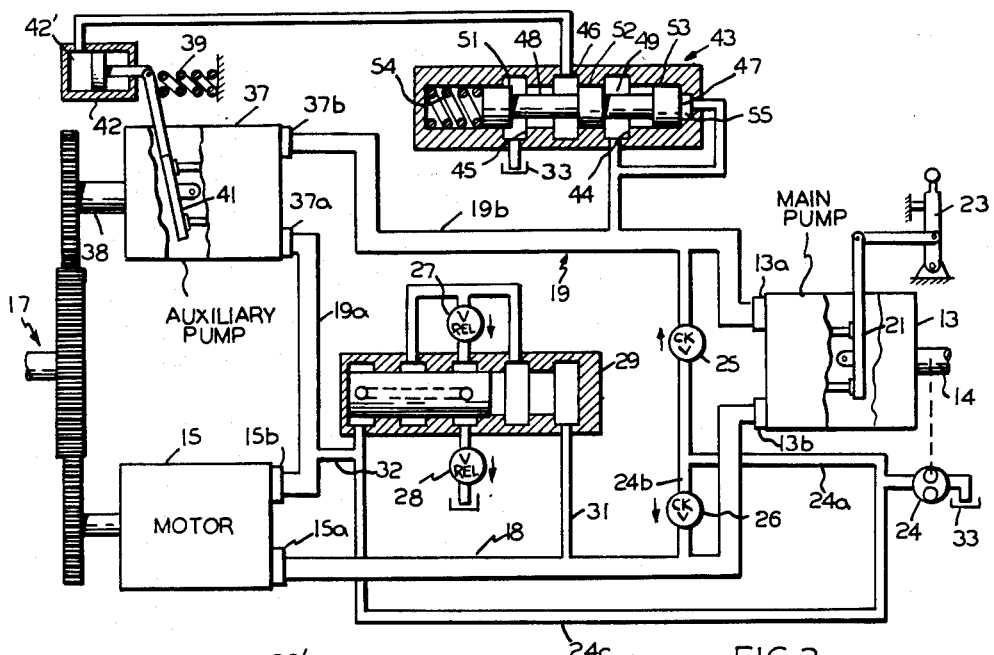
FIG. 3 is a schematic diagram of a unidirectional transmission incorporating the preferred auxiliary loading means.
Figure 4:
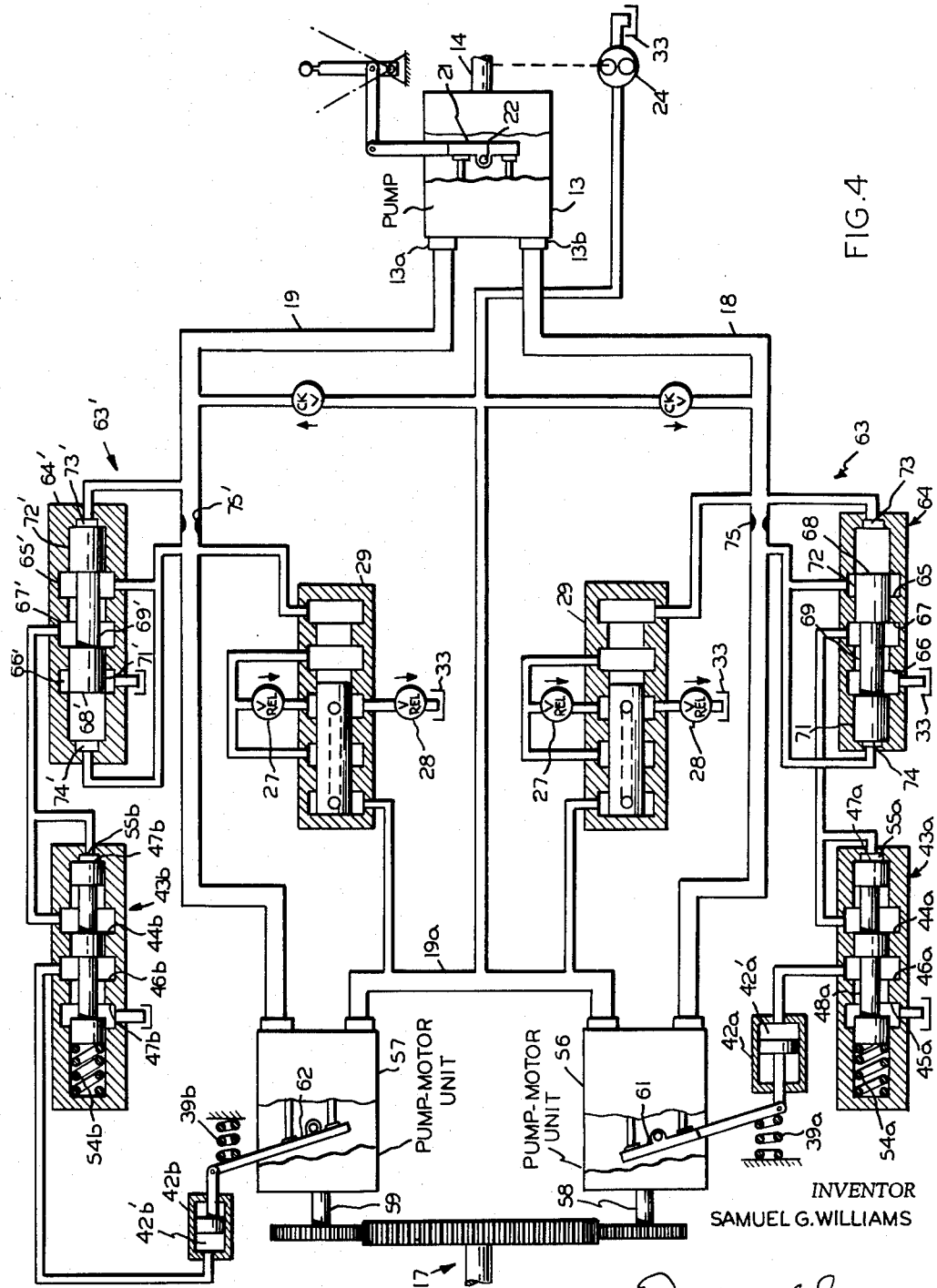
FIG. 4 is a schematic diagram of a reversible transmission incorporating the preferred auxiliary loading means.

Although the embodiments of FIGS. 1 and 2 provide rather inexpensive ways of effecting smooth driving action, they are inefficient because of the large energy losses in the relief valves 34 and 34'. In cases where initial cost is not of primary importance, the embodiments of FIGS. 3 and 4 are preferred. As shown in FIG. 3, the preferred auxiliary loading means comprises a pressure compensated pump 37 of the rotary cylinder barrel, longitudinally reciprocating piston type having a drive shaft 38 connected in driven relation with motor 15, and inlet and discharge ports 37a and 37b, respectively, which are connected with the discharge port 15b of motor 15 and the inlet port 13a of pump 13, respectively, by the portions 19a and 19b of main conduit 19. The compensator for pump 37 includes a spring 39 that biases cam plate 41 toward the illustrated maximum displacement position, a control motor 42 arranged to shift the cam plate 41 toward the zero displacement position against the bias of spring 39, and a pilot valve 43 which responds to the pressure in conduit portion 19b and serves selectively to vent and pressurize the working chamber 42' of motor 42. Pilot valve 43 includes an inlet chamber 44 which is connected with conduit portion 19b, and exhaust chamber 45 which is in continuous communication with reservoir 33, and outlet chamber 46 which is connected with working chamber 42', and a reciprocable valve plunger 47 formed with a pair of annular grooves 48 and 49 that define three lands 51, 52 and 53. Valve plunger 47 has a vent position, which is illustrated in the drawing and toward which it is biased by spring 54, in which outlet chamber 46 is isolated from inlet chamber 44 by land 52 and is connected with exhaust chamber 45 by annular groove 48, a supply position in which outlet chamber 46 is connected with inlet chamber 44 by annular groove 49 and isolated from exhaust chamber 45 by land 52, and an intermediate lap position in which land 52 isolates outlet chamber 46 from both of the other chambers. The valve plunger is shifted to its supply position against the bias of spring 54 by the pressure in chamber 55 which is in continuous communication with conduit portion 19b.

As is known in the art, the pressure compensator varies the displacement of pump 37 in inverse relation to the pressure in its discharge path, here conduit portion 19b, so as to maintain the discharge pressure substantially constant at a predetermined value. When the pressure in conduit portion 19b is at said predetermined value, valve plunger 47 assumes its lap position to thereby hydraulically lock motor 42 and cause it to hold cam plate 41 in its current position. Should the pressure in conduit portion 19b decrease, spring 54 shifts valve plunger 47 toward its vent position and allows spring 39 to move the cam plate 41 to an increased displacement position. When the pressure is restored to the predetermined value, valve plunger 47 is shifted back to its lap position to again hydraulically lock motor 42. On the other hand, if the pressure in conduit portion 19b rises above the predetermined value, valve plunger 47 is shifted toward its supply position wherein it transfers fluid under pressure from conduit portion 19b to working chamber 42'. In this case, motor 42 moves cam plate 41 to a reduced displacement position. When the pressure is restored, valve plunger 47 moves back to the lap position to again hydraulically lock motor 42.

Conduit portion 19a, which constitutes the inlet path for pump 37, is connected with charge pump 24 through conduit 24c and also with low pressure relief valve 28 through shuttle valve 29. These connections insure that the inlet pressure of pump 37 is maintained substantially constant. Since the compensator maintains the discharge pressure of this pump substantially constant, it should be apparent that the torque load which this pump 37 imposes on motor 15 will be substantially constant. The magnitude of this load depends upon the same factors as the setting of relief valve 34 in FIG. 1 and can be varied by changing the setting of the pressure compensator.

It will be observed that the fluid discharged by pump 37 to conduit portion 19b forms the supply for pump 13. Because of this, a large part of the energy expended at pump 37 is recouped at pump 13 in the form of a reduction in the energy demanded by this pump to raise the pressure of the fluid to that required in main conduit 18. This scheme, then, is a much more efficient way of loading motor 15 than the one shown in FIG. 1.

The reversible form of the FIG. 3 embodiment is shown in FIG. 4. This embodiment uses a pair of pressure compensated pump-motor units 56 and 57 in lieu of the fixed displacement motor 15 and pressure compensated pump 37, respectively, and includes flow direction sensing means for selectively rendering one or the other of the pressure compensators ineffective to reduce unit displacement when main pump 13 is discharging to the unit associated with that compensator. Here, the main pump 13 is of the over center type. The two pump-motor units 56 and 57 are of the rotary cylinder barrel, longitudinally reciprocating piston type and each includes a shuttle valve 29 and high and low pressure relief valves 27 and 28. The drive shafts 58 and 59 of the two units are connected together by the gear train 17 which drives the tank 11 (not shown). The pressure compensators of these two units which regulate the positions of cam plates 61 and 62 are identical and are the same as the compensator shown in FIG. 3 so their components bear the same reference numerals as the counterparts in FIG. 3 with the postscripts a and b added for clarity. However, unlike the pressure compensator of FIG. 3, wherein the inlet chamber 44 and the chamber 55 of pilot valve 43 are in continuous communication with one of the main conduits, the corresponding chambers in pilot valves 43a and 43b are selectively connected with the reservoir 33 and with one of the main conduits 18 and 19 by flow direction sensors 63 and 63'. Flow direction sensor 63 comprises a shuttle valve 64 having an inlet chamber 65 connected with main conduit 18, an exhaust chamber 66 connected with reservoir 33, an outlet chamber 67 connected with the chambers 44a and 55a of pilot valve 43a, and a reciprocable valve plunger 68 which selectively connects outlet chamber 67 with the inlet and exhaust chambers 65 and 66, respectively. Valve plunger 68 is formed with an annular groove 69 that defines a pair of lands 71 and 72 and is shifted between its limiting positions by the pressure differential between a pair of chambers 73 and 74 which are connected with main conduit 18 at points on opposite sides of metering orifice 75. When main pump 13 is discharging to main conduit 18, the pressure in chamber 73, which is the pressure at the upstream side of orifice 75, is higher than the pressure in chamber 74, so valve plunger 68 assumes the illustrated position in which groove 69 interconnects chambers 66 and 67 and land 72 isolates chamber 67 from chamber 65. On the other hand, when pump 13 discharges to main conduit 19 and main conduit 18 is the return conduit, the pressure in chamber 74 is higher than the pressure in chamber 73 and valve plunger 68 shifts to the right to a position in which annular groove 69 connects outlet chamber 67 with chamber 65 and land 71 isolates chamber 67 from chamber 66. Flow direction sensor 63' includes an identical shuttle valve 64' and a metering orifice 75' which is interposed in main conduit 19.

When the cam plate 21 of pump 13 is moved in the clockwise direction from the illustrated zero displacement position to cause the pump to discharge to main conduit 18, and thus to drive the tank in the forward direction, shuttle valve 64 assumes the illustrated position in which it vents chambers 44a and 55a of pilot valve 43a to reservoir 33. As a result, the pilot valve 43a assumes its vent position and spring 39a moves cam plate 61 to, and holds it in, the maximum displacement position. Therefore, pump-motor unit 56 now serves as a fixed displacement motor. Since, during forward operation, main conduit 19 is the return conduit, the pressure in chamber 74' is higher than the pressure in chamber 73' and shuttle valve 64' also assumes the illustrated position. However, in this case, the shuttle valve connects chambers 44b and 55b of pilot valve 43b with the main conduit so that this compensator functions in the normal way to maintain the pressure in main conduit 19 substantially constant. When, on the other hand, the cam plate 21 of pump 13 is moved in the opposite direction from the zero displacement position and pump 13 discharges to main conduit 19, the valve plungers 68 and 68' of shuttle valves 64 and 64' shift to the right and left, respectively. Now the chambers 44b and 55b of pilot valve 43b are vented, and the chambers 44a and 55a of pilot valve 43a are connected with main conduit 18, so the compensator of pump-motor unit 57 becomes inactive and the compensator of unit 56 becomes active. Thus, when the tank is driven in reverse, unit 57 functions as a fixed displacement motor and unit 56 functions as a pressure compensated pump. Since the conduit portion 19a interconnecting units 56 and 57 is connected with charge pump 24 and the pressure in this conduit is regulated by the low pressure relief valves 28, it will be apparent that regardless of the direction of operation, one of the pump-motor units 56 and 57 will exert a substantially constant load on the other unit and thus serve to insure smooth driving action.

While, in the illustrated embodiments, a part of the driven device itself (such as eccentric hatch 12) causes that device to exert a variable load on the driving system, it will be apparent that the present invention can be employed usefully in installations wherein the variable nature of the load is attributable to external conditions. An example of such an installation is a rotary radar antenna which is subject to wind loads that at times retard motion and at other times aid motion. Regardless of the cause of the variation in loading, the transmission of this invention reduces the magnitude of jerks and insures smooth driving action.

As stated previously, the drawings and description relate only to several illustrative embodiments of the invention. Since changes can be made in the structures of these embodiments without departing from the inventive concept, the following claims should provide the sole measure of the scope of the invention.

What is claimed is:
1. A hydrostatic transmission comprising
 (a) a reversible pump having inlet and discharge ports;
 (b) a reversible motor having inlet and discharge ports;
 (c) a first conduit connecting the inlet port of the pump with the discharge port of the motor;
 (d) a second conduit connecting the discharge port of the pump with the inlet port of the motor;

(e) a relief valve located in the first conduit and arranged to permit flow from the motor to the pump upon the occurrence of a predetermined pressure differential across the relief valve;

(f) a second relief valve located in the second conduit and arranged to permit flow from the motor to the pump upon the occurrence of a predetermined pressure differential across the relief valve;

(g) a first one-way flow means for permitting flow from one port of the pump to one port of the motor but blocking flow in the reverse direction; and (h) second one-way flow means for permitting flow from the other port of the pump to the other port of the motor but blocking flow in the reverse direction.

2. A hydrostatic transmission comprising
(a) a main pump having inlet and discharge ports;
(b) a motor having inlet and discharge ports;
(c) a first conduit connecting the inlet port of the main pump with the discharge port of the motor;
(d) a second conduit connecting the discharge port of the main pump with the inlet port of the motor;
(e) a variable delivery, discharge pressure compensated auxiliary pump driven by the motor and having inlet and discharge ports connected with a hydraulic circuit;
(f) means for maintaining the inlet pressure to the auxiliary pump substantially constant.

3. A hydrostatic transmission as defined in claim 2 in which the inlet and discharge ports of the variable delivery, pressure compensated pump are connected with the discharge port of the motor and the inlet port of the main pump, respectively, through portions of the first conduit, whereby said circuit comprises the main pump, the motor and the first and second conduits.

4. A hydrostatic transmission comprising
(a) a variable displacement pump of the overcenter type having a pair of ports, either of which may be the inlet port and the other of which is the discharge port;
(b) a first variable displacement pump-motor unit having a pair of ports and including a displacement control element movable between minimum and maximum displacement positions and a drive shaft;
(c) a second variable displacement pump-motor unit having a pair of ports and including a displacement control element movable between minimum and maximum displacement positions and a drive shaft;
(d) means interconnecting the drive shafts of the two pump-motor units so that either may drive or be driven by the other;
(e) conduit means connecting the pump and the two pump-motor units in a closed circuit in which one port of the pump is connected with one port of the first pump-motor unit, the other port of the first pump-motor unit is connected with one port of the second pump-motor unit, and the other port of the second pump-motor unit is connected with the other port of the pump;
(f) control means for regulating the displacement of the first pump-motor unit in inverse relation to the pressure in that portion of the conduit means between the first unit and the pump, and for regulating the displacement of the second pump-motor unit in inverse relation to the pressure in that portion of the conduit means between the pump and the second unit;

(g) override means responsive to the direction of flow through the closed circuit for maintaining the displacement control element of the first pump-motor unit in a certain displacement position other than minimum displacement position when flow is from the pump to this unit, and for maintaining the displacement control element of the second pump-motor unit in a certain displacement position other than minimum displacement position when flow is from the pump to this unit; and (h) means for maintaining the pressure in that portion of the conduit means between the two pump-motor units substantially constant.

5. A hydrostatic transmission as defined in claim 4
(a) in which each of said minimum displacement positions is a zero displacement position; and
(b) in which each of said certain displacement positions is a maximum displacement position.

6. A hydrostatic transmission as defined in claim 4
(a) in which the control means comprises
(1) a first pressure compensator for varying the position of the displacement control element of the first pump-motor unit and having a flow connection with that portion of the conduit means between the pump and the first unit, and
(2) a second pressure compensator for varying the position of the displacement control element of the second pump-motor unit and having a flow connection with that portion of the conduit means between the pump and the second unit; and
(b) in which the override means comprises
(1) first flow direction responsive means for closing the flow connection between the first pressure compensator and the conduit means and venting that compensator when flow is from the pump to the first pump-motor unit, and
(2) second flow direction responsive means for closing the flow connection between the second pressure compensator and the conduit means and venting that compensator when flow is from the pump to the second pump-motor unit.

References Cited by the Examiner

UNITED STATES PATENTS

| | | | |
|---|---|---|---|
| 1,985,443 | 12/34 | Clute | 60—52 |
| 2,984,985 | 5/61 | MacMillin | 60—52 X |

FOREIGN PATENTS

| | | |
|---|---|---|
| 639,148 | 6/50 | Great Britain. |
| 872,471 | 7/61 | Great Britain. |

JULIUS E. WEST, *Primary Examiner.*

EDGAR W. GEOGHEGAN, *Examiner.*